Patented Jan. 9, 1923.

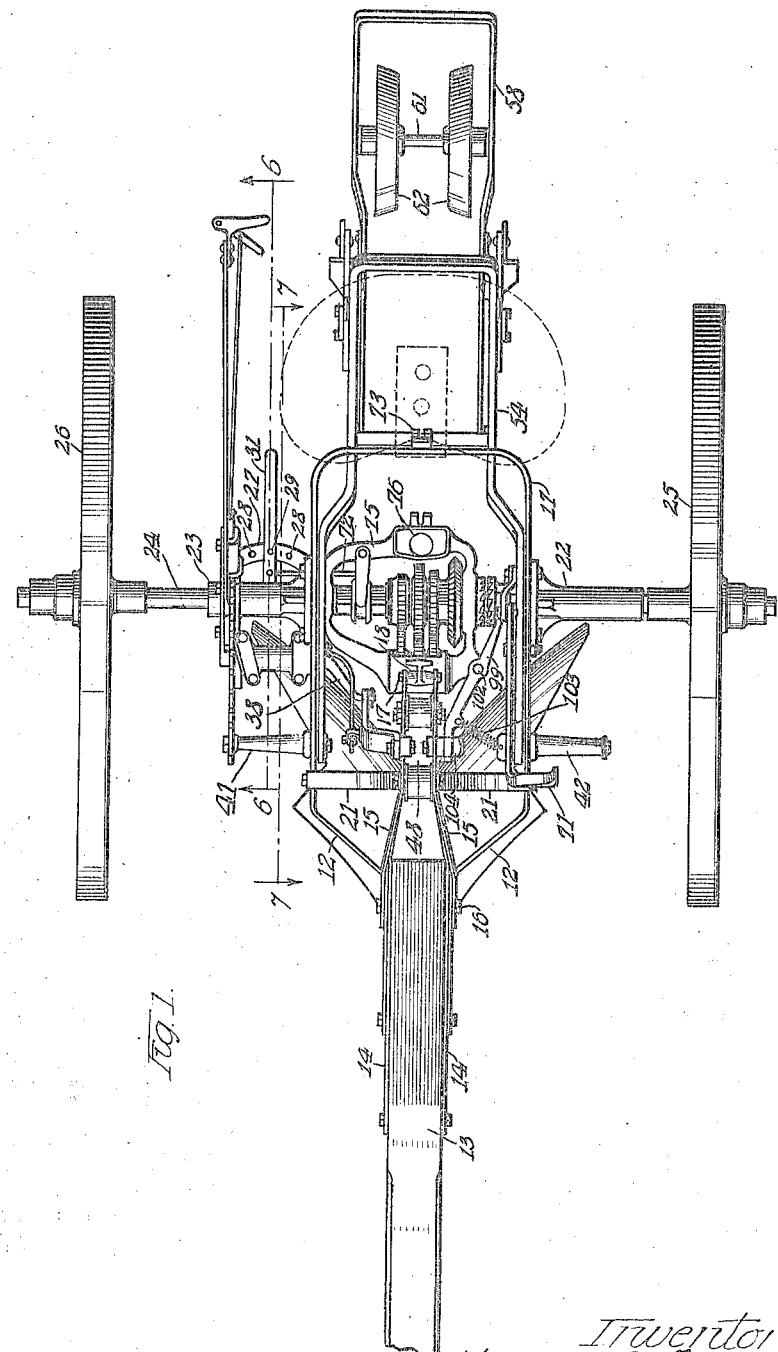

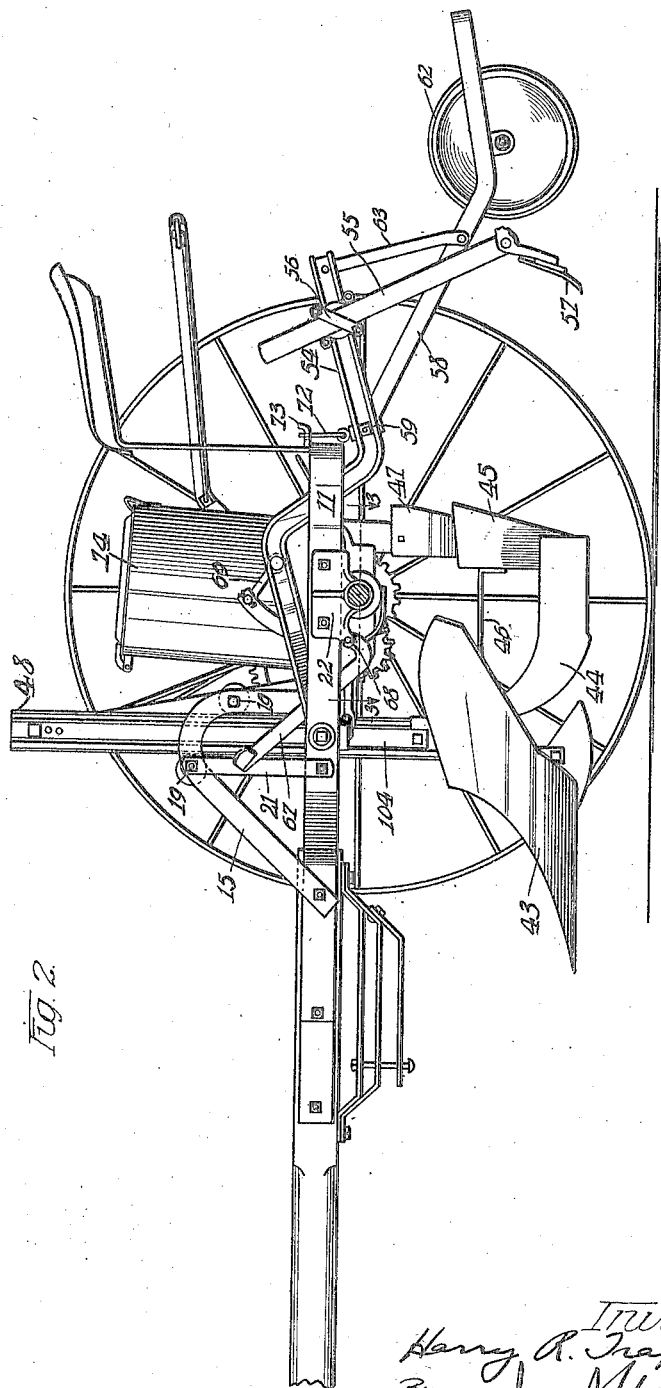

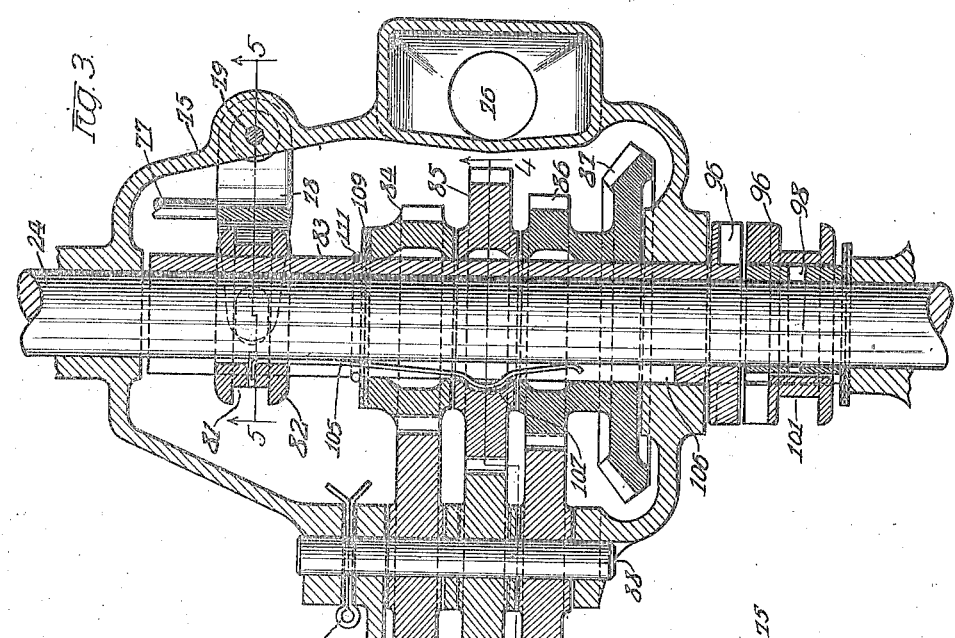

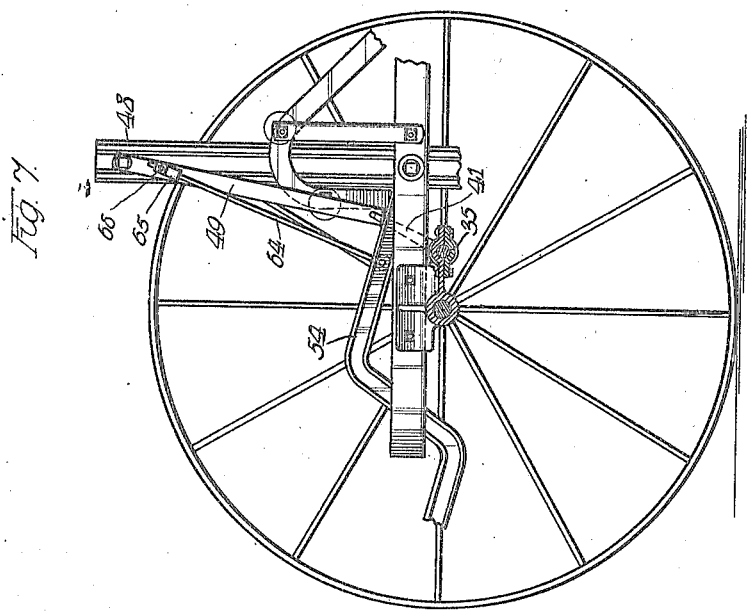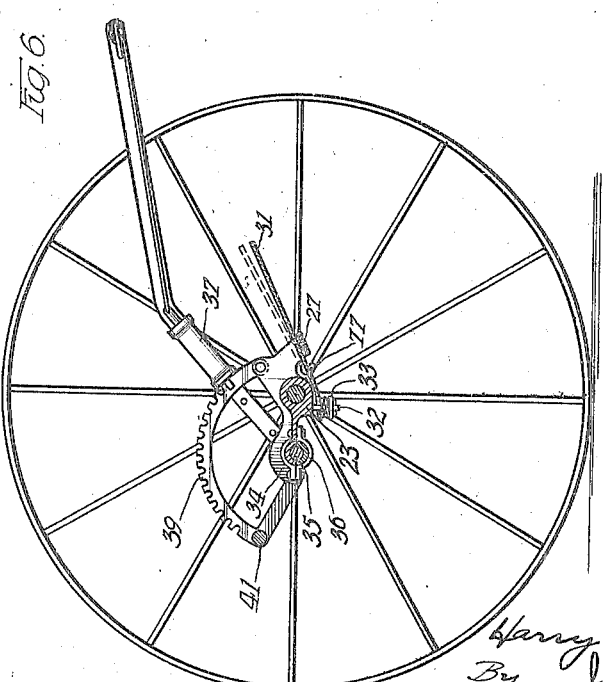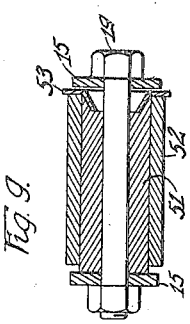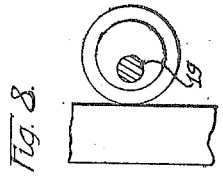

1,441,764

UNITED STATES PATENT OFFICE.

HARRY R. TRAPHAGEN, OF ROCKFORD, ILLINOIS, ASSIGNOR TO EMERSON-BRANTINGHAM COMPANY, OF ROCKFORD, ILLINOIS, A CORPORATION OF ILLINOIS.

PLANTER.

Application filed November 21, 1919. Serial No. 339,665.

*To all whom it may concern:*

Be it known that I, HARRY R. TRAPHAGEN, a citizen of the United States, residing at Rockford, in the county of Winnebago and State of Illinois, have invented certain new and useful Improvements in Planters, of which the following is a specification.

This invention relates in general to planters, and has more particular reference to single-row planters of the type adapted for planting cotton, although it is also suitable for planting corn and other grains, which are planted in rows.

One of the primary objects of my present invention is the provision in a planter of this character, of mechanism whereby the speed of the seed-dropping mechanism may be varied to suit the requirements of different conditions of soil, while the planter is in operation.

Another object is the provision of speed-changing mechanism for this purpose which can be constructed as a unit and so tested before being incorporated in the structure of the machine as a whole.

A further object is to provide simple, but at the same time strong and durable apparatus by which the various speed changes may be made, and which by reason of its construction and embodiment in the machine itself, will add to its strength and rigidity.

A further object of the invention is the provision of novel mechanism for raising and lowering the furrow-opening apparatus and also the seed-covering apparatus, and furthermore, to provide independent foot-operating mechanism by which the seed-covering apparatus may be raised independently of the furrow-opening device for the purpose of relieving it from weeds and other trash which are apt to collect thereon when the machine is in use.

Another feature of the invention resides in the provision of a novel construction, whereby the seed-dropping mechanism is automatically thrown out of operation when the furrow-opening device is raised to inoperative position.

A further object is the provision of novel guides for the vertically movable beam which carries the furrow-opening device, these guides being constructed so as to provide for adjustment to take up any lost motion resulting from irregularities in the beam structure, or which may result from wear.

Other objects and many of the attendant advantages of my invention will be readily appreciated as the same becomes better understood by reference to the following description when considered in connection with the accompanying drawings.

Referring to the drawings:—

Figure 1 is a plan view of a planter embodying my invention, the seed hopper being removed;

Fig. 2 is a side elevation of the planter shown in Fig. 1;

Fig. 3 is a horizontal sectional view showing the speed changing mechanism, this view being taken on the line 3—3 of Fig. 2;

Fig. 4 is a transverse sectional view on the line 4—4 of Fig. 3;

Fig. 5 is a transverse sectional view on the line 5—5 of Fig. 3;

Fig. 6 is a detail view, partially in section, showing the raising and lowering lever and the casting upon which it is mounted, this view being taken on the line 6—6 of Fig. 1;

Fig. 7 is a somewhat similar view, but looking in the opposite direction from the line 7—7 of Fig. 1;

Fig. 8 is a detail view of one of the adjustable beam guide rollers; and

Fig. 9 is a transverse sectional view through the roller shown in Fig. 8.

Referring now to the drawings more in detail, reference character 11 indicates generally the main portion of the frame structure of the machine, which is in the shape of a yoke having its arch rearwardly disposed and its sides converged at their forward ends as indicated at 12, the extremities thereof being arranged in parallel relation on opposite sides of the tongue or pole 13 to which they are securely bolted. Another pair of straps indicated by reference character 14 bolted at their forward ends to the tongue extend rearwardly from the tongue and have their rear ends attached to a casting 75. A third pair of straps 15 connected at their forward ends by the bolt 16 to opposite sides of the tongue, is upwardly arched, the rear end of each strap being brought downwardly and secured by a bolt 17 to a lug 18 formed on the change-speed mechanism carrying casting which will be later described. The arched straps 15 are connected intermediate their ends by bolts 19 upon which the adjustable beam-guiding rollers are mounted, as will be later described, and these straps are laterally braced by brace-members 21, connected at their upper ends by one of the bolts 19 and bolted at their lower ends to the side members of the main frame yoke 11. By this construction a rigid and durable frame structure is provided to which the operating mechanisms of the machine are attached, as will be hereinafter explained.

To the left side of the frame yoke 11 looking forwardly toward the machine, there is rigidly secured by bolts, a bearing 22, and likewise to the right side of this frame yoke there is securely bolted another bearing 23 in alignment with the bearing 22, and the weight of the machine is carried by these bearings upon the main shaft 24, equipped at its ends with the ground wheels 25 and 26, which are pinned or otherwise non-rotatably secured to the shaft. The bearing casting 23 has also formed integrally therewith, a horizontally disposed arcuate web or plate 27, provided at spaced intervals with apertures 28 adapted to receive the holding pin 29 of a pivotally mounted speed-changing lever 31 pivoted at its forward end upon a pin 32 depending from the casting 23, as best illustrated in Fig. 6. A coiled spring 33 surrounding the pin serves to prevent this lever from becoming disengaged from the sector plate 27. The casting 23 is furthermore formed, as shown in Fig. 6, to provide the upper half 34 of a bearing for a rock shaft 35, the lower half of the bearing consisting of a separate piece, secured by bolts or otherwise, to the upper portion 34. A hand lever 37 is fixed to the outer end of the rock shaft 35 and its inner end is formed to provide a crank arm 38 (Fig. 1), the purpose of which will be later explained. A sector 39 notched to accommodate the latch of the hand lever in the usual manner is secured to the casting 23 as shown, and its forward portion is braced and strengthened by a member 41 extending laterally from the frame yoke 11 and bolted to the sector. This member 41 also serves as a step by which the operator may mount the machine, and a similar step 42 on the opposite side of the machine serves a similar purpose.

The furrow-opening apparatus comprises in the present instance, a plow 43 of the middlebreaker type and a shoe 44 following the plow and bifurcated at its rear end to accommodate said seed delivery chute, a lower portion 45 of which is carried by the shoe and held in position by a brace 46, and the upper portion 47 of which depends from the frame of the machine beneath the hopper. The two portions 45 and 47 are adapted to telescope when the shoe is raised to inoperative position, as shown in Fig. 2. The furrow-opening apparatus consisting of the plow and shoe just described, are both carried by a vertically disposed beam 48, which extends upwardly between the arched straps 15 and is guided by the guide rollers mounted upon the bolts 19. A link 49 (Figs. 1 and 7) is connected at its upper end to the beam 48 and at its lower end to the crank arm 41 of the rock shaft 35, so that when this shaft is rocked the beam and the furrow-opening apparatus carried thereby, will be raised and lowered. In other words, when the hand lever is in the position shown in the various figures of the drawings, the crank 41 will be positioned to hold the beam 48 in elevated position, as shown. But when the lever is swung forwardly about its axis, the beam 48 and the furrow-opening apparatus carried thereby, will be depressed into operative relation with the ground.

The adjustable guide rollers for the vertically movable beam are illustrated in detail in Figs. 8 and 9, from which it will be observed that upon the bolt 19 connecting the arched straps 15, I have mounted a cylindrical member 51 in eccentric relation to the bolt by reason of the fact that the longitudinal opening through the member 51 is disposed eccentrically. Upon this member 51 is rotatably disposed a roller 52, with which the beam 48 contacts, this roller as will be apparent from the drawings, being slightly shorter than the member 51 so that it will not be clamped against rotation between the arched straps 15 when the bolt 19 is tightened up. At one end the member 51 is provided with a disk 53 fixedly secured thereto and projecting radially outside the perimeter of the roller 52 in position to be grasped by the hand so that the member 51 may be rotated or adjusted into proper relation with respect to the beam 48, whereupon by tightening up the bolt 19 the member 51 is clamped in this adjusted position, while the roller 52 is free to revolve thereon. By this construction I am enabled to adjust the guide rollers for the vertically movable beam so that the beam will be snugly held at all times, these adjustable rollers permitting adjustment for inaccuracies in dimensions of the beam and also affording provision for taking up lost motion resulting from wear.

The covering apparatus by which the seed deposited in the furrow formed by the plow 43 and shoe 44 are covered, is carried by a yoke-shaped frame 54 pivoted at its forward end to the main frame yoke 11 on the bolts which carry the step members 41 and 42, and this frame is bent vertically as illustrated in Fig. 2, so that it may be raised to the required height and without interfering with the main frame 11. It will be observed that near its rear end the frame 54 is equipped at each side with a shovel-carrying standard 55 adjustably secured to the frame by clamps 56, and each standard carrying at its lower end a covering shovel 57 adapted to throw the earth inwardly over the planted seeds.

A secondary yoke 1 frame 58 is secured at its forward end at 59 to the frame 54, and near its rear end it is provided with a transverse shaft 61 upon which are mounted a pair of covering and presser wheels which press down the earth on each side of the planted row. In operation, the weight of the rear end of the frame 54 is carried by these wheels, and a pair of connecting links 63 between the rear end of the frame 54 and the frame 58, serve to strengthen the construction and make it more rigid.

The frame 54 carrying the seed-covering devices is automatically raised with the furrow-opening devices by means of a link 64 connected at its lower end with one side of the frame 54 and having its upper end inserted through an eye 65 projecting laterally from the link 49, said upper end being equipped with an adjustable abutment or collar 66, so that when the link 49 is elevated this link 64 will elevate the frame 54 to the position shown in Fig. 2. The extent of elevation may, of course, be varied by adjustment of the abutment collar 66.

In order that the covering apparatus may be raised independently of the furrow-opening mechanism to relieve the covering shovels from trash which has a tendency to collect thereon, I have provided a separate foot-operated lifting mechanism consisting of a lever 67 pivoted on the casting 22 at 68, the rear arm of this lever being connected by a link 69 with the frame 54, as shown in Fig. 2. When the machine is in operation, the forward end of the lever 67 which is equipped with a foot pedal 71 is disposed substantially in vertical position where it may be readily engaged by the left foot of the operator. By depressing the forward end of this lever the frame 54 is lifted so as to clear the shovels of trash, and upon release of the lever the parts will return to normal operative position by gravity. In order that this frame may be locked in elevated position so as to relieve some of the strain on the hand lever 37 and associated parts, I have provided the frame with a link 72 adapted to be engaged over a hook 73 projecting laterally from the frame 11 by which the weight of the frame 54 and the parts carried thereby may be supported as shown in Fig. 2.

The seed hopper indicated by reference character 74, is carried upon a yoke-shaped casting indicated generally by reference character 75, disposed within the main frame 11 and securely bolted thereto at one side, preferably by means of the same bolts that secure the bearing casting 23 to the main frame. The seed hopper is equipped with seed-dropping mechanism of any well known or preferred construction adapted to deliver seeds from the hopper into the opening 76 formed in the casting 75 through which they are deposited by the collapsible shoes 47 and 45 in the ground. The rate at which the seeds will be delivered from the hopper depends, of course, upon the speed at which the dropping mechanism is driven, and with a view to driving this dropping mechanism at any desired speed I have provided change-speed drive mechanism which will now be described.

Referring more particularly to Figs. 1, 3 and 4, it will be observed that the casting 75 which is mounted on the shaft 24 and also secured to the frame 11 as previously described, serves as a proper support and also as a sort of housing for the driving member. The adjusting lever 31 which has been previously described, is connected by a link 77 with a bifurcated lever 78 pivoted to the casting 75 at 79. The bifurcated ends of this lever are engaged in an annular groove 81 formed in a collar 82 which is splined to a sleeve 83 surrounding the main shaft 24, which sleeve is rotatably disposed upon this shaft. Upon this sleeve is rotatably mounted three gear wheels 84, 85 and 86 respectively, of different diameters, the gear wheel 86 having formed integrally therewith a bevel gear 87 adapted to mesh with and drive a gear which forms part of the seed-dropping mechanism carried by the superposed hopper.

Upon a stationary countershaft 88 mounted at one side of the casting 75 and held in position therein by a cotter pin 89 as shown in Fig. 3, there are rotatably mounted three gears 91, 92 and 93, meshing respectively with the gears 84, 85 and 86, as shown. These three gears on the counter-shaft are also connected together by interengaging clutch shoulders and sockets 94 and 95 formed on opposed faces of these gears so that they rotate in unison.

The sleeve 83 is driven from the shaft 24 through the intermediary of a clutch consisting of a clutch member 96 formed upon one end of and preferably integral with the sleeve 83, and a member 97 keyed to the shaft 24 by a key 98 operating in a slot in the member 97, which permits movement of this clutch member longitudinally of the shaft into and out of engagement with the clutch member 96. The clutch member 97 moves longitudinally to engage or disengage the clutch by means of a lever 99 (Fig. 1) having one end engaged in the groove 101 formed in the periphery of the member 97, said lever being pivoted to the casting 75 at 102 and being actuated by a contractile spring 103 which normally urges the clutch into clutching engagement. A cam member 104 mounted upon one side of the vertical beam 48 is adapted when the beam is raised, to engage the end of this lever and swing it upon its pivot so as to withdraw the clutch member 97 from engagement with the member 96.

Thus, it will be seen that upon raising of the furrow-opening apparatus, the clutch which establishes driving connection between the shaft and seed-dropping mechanism is automatically disengaged.

Driving connection between the sleeve 83 and the gear 86 carrying the bevel driving gear 87 is established by means of a connecting element under the control of the speed-changing lever 31. This element consists of a spring key 105 secured at its outer end in the collar 82 and lying in the kerf 106 formed in the sleeve 83. Intermediate its ends this key is formed to provide an outwardly projecting locking shoulder 107, and each of the gears 84, 85 and 86 is provided with a series of sockets 108 adapted to receive this locking shoulder, whereby the gear is locked to the sleeve 83 to rotate therewith. The key 105 may be moved longitudinally to lock any one of the gears 84, 85 or 86 to the sleeve 83 by manipulation of the lever 31, either when the machine is runing or when it is idle, and if any socket 108 should not be in alignment with the key when it is moved longitudinally, the key will yield inwardly until such socket is brought into alignment with the key, whereupon the resiliency of the key will force its locking shoulder outwardly into the socket to lock the wheel to the sleeve.

Assuming for instance, that wheel 85 has been locked to the sleeve as shown in Fig. 3, power will now be transmitted to the seed-dropping bevel gear 87 through gears 92, 93 and 86, and since gear 85 is larger than gear 92, it is obvious that the dropping mechanism will be driven at increased speed. Should a speed slower than the speed of rotation of the shaft 24 be desired, the lever 23 is moved to the right viewing Fig. 1, to lock the gear 84 to the sleeve 83, whereupon the drive is established through gears 84, 91, through 92 to 93 and 86, gear 85 being permitted to rotate idly. Gear 86 may be directly locked to the sleeve 83 so that it will rotate at the same speed as the shaft 24 by moving the locking key into engagement with this gear, in which event all of the other gears will rotate idly. It will be manifest that by this construction I have provided for three speed changes, so that seed-dropping mechanism may be driven at any desired speed relatively to the speed of the main drive shaft 24 and that these speed changes may be readily and quickly effected by simply moving the speed-change lever 31 to the right or to the left to lock the requisite gear of the train to the shaft. The gears are maintained in position on the sleeve between the casting 75 at one end and a pair of washers 109 at the other end which are held in position on the sleeve 83 by a locking ring 111.

It is believed that my invention, its mode of operation and many of its attendant advantages will be understood and appreciated from the foregoing without further description; and it should be mainfest that various details of construction illustrated and described are capable of wide modification and variation without departure from the essence of the invention as defined in the following claims; in which—

I claim:

1. In a planter, the combination of a carrying shaft, a plurality of bearings therefor, a lever-locking sector carried by one of said bearings, a lever pivoted to said bearing and co-operating with said sector, a member mounted on said shaft between said bearings, a seed hopper carried by said member, driving mechanism between said shaft and seed hopper arranged within said member, and means actuated by said lever for varying the ultimate driving speed of said driving mechanism.

2. In a planter, the combination of a carrying shaft, a plurality of bearings therefor, one of said bearings being provided with a lever locking sector, a speed-changing lever pivoted to said bearing and co-operating with said sector, a hopper arranged between said bearings, transmission mechanism beneath said hopper, means controlled by said lever for varying the ultimate speed of said transmission mechanism, a clutch between said shaft and said transmission mechanism, a furrow-opening device, and means for automatically disengaging said clutch upon lifting of said furrow-opening device.

3. In a planter, the combination of a carrying shaft, a bearing therefor, furrow-opening apparatus, seed delivery mechanism, a lever mounted on said bearing for raising and lowering said furrow-opening apparatus, a lever mounted on said bearing for controlling the speed of said seed-delivery mechanism, seed-covering apparatus, a connection between said seed-covering apparatus and said furrow-opening apparatus, whereby the seed-covering apparatus is rendered inoperative upon lifting movement of said furrow-opening apparatus, and foot-actuated means for lifting said seed-covering apparatus independently of said furrow-opening apparatus.

4. In a planter, the combination of a wheel-supported drive shaft, seed delivery mechanism, a unit assembly directly mounted on said shaft and supporting said seed delivery mechanism, said unit assembly including a frame part, a sleeve on said shaft and operatively associated with said frame part, gearing between said sleeve and said seed delivery mechanism for driving the latter; and means for establishing a driving connection between said shaft and sleeve.

5. In a planter, the combination of a carrying shaft, a pair of spaced bearings on the shaft, a main frame attached to and supported on said bearings, a casting mounted on the shaft intermediate said bearings, a sleeve loose on the shaft within said casting and equipped beyond one end thereof with a clutch face, a clutch member rotatable with and slidable lengthwise on the shaft intermediate said clutch face and the adjacent bearing for connecting said sleeve to the shaft, seed delivery mechanism and a hopper mounted on the casting.

6. In a planter, the combination of a wheel-supported drive shaft, seed delivery mechanism and a hopper therefor, and a unit assembly adapted as such to be mounted on said shaft and comprising a frame structure for supporting said seed delivery mechanism and hopper, and mechanism adapted to be driven by said shaft for operating said seed delivery mechanism.

7. In a planter, the combination of a wheel-supported driving shaft, a sleeve loose on said shaft, means for establishing a driving connection between said sleeve and shaft, a frame part having a bearing on said sleeve and thereby sustained in operative relation to said shaft, seed delivery mechanism mounted on said frame part, and mechanism adapted to be driven by said sleeve for operating said seed delivery mechanism, said frame part, sleeve, and driving mechanism constituting a unit assembly.

8. In a planter, the combination of a wheel-supported drive shaft, a main frame supported on said drive shaft and equipped with a furrow-opening device, seed delivery mechanism, and a unit assembly of parts mounted on said shaft for supporting said seed delivery mechanism in operative relation to said furrow opener and for establishing a driving connection between said shaft and seed delivery mechanism.

HARRY R. TRAPHAGEN.